United States Patent [19]

Hartmann et al.

[11] Patent Number: 4,705,243

[45] Date of Patent: Nov. 10, 1987

[54] SYSTEM OF EXTERNALLY HOLDING AND GUIDING SUPPLY LINES TO MOVING IMPLEMENTS OF MANIPULATORS

[75] Inventors: Georg Hartmann, Aichach; Kurt Wiedemann, Augsburg; Ernst Zimmer, Friedberg, all of Fed. Rep. of Germany

[73] Assignees: KUKA Schweissanlangen; Roboter GmbH, both of Fed. Rep. of Germany

[21] Appl. No.: 743,320

[22] PCT Filed: Oct. 4, 1984

[86] PCT No.: PCT/EP84/00304

§ 371 Date: Jun. 10, 1985

§ 102(e) Date: Jun. 10, 1985

[87] PCT Pub. No.: WO85/01686

PCT Pub. Date: Apr. 25, 1985

[30] Foreign Application Priority Data

Oct. 19, 1983 [DE] Fed. Rep. of Germany ....... 3337948
Sep. 22, 1984 [DE] Fed. Rep. of Germany ....... 3434899

[51] Int. Cl.$^4$ .......................................... F16M 13/00
[52] U.S. Cl. ..................................... 248/51; 248/660; 248/160; 248/74.1; 901/15
[58] Field of Search .................. 248/51, 52, 60, 75, 248/74.1, 316.5, 160, 660, 311.2, 646; 403/164; 901/15

[56] References Cited

U.S. PATENT DOCUMENTS

| | | | |
|---|---|---|---|
| 823,594 | 6/1906 | Frazee | 403/164 X |
| 1,069,937 | 8/1913 | Goehst | 248/74.1 X |
| 1,668,953 | 5/1928 | Erickson | 248/74.1 X |
| 2,122,988 | 7/1938 | Nelson | 248/51 X |
| 2,372,214 | 3/1945 | Loepsinger | 248/60 X |
| 2,748,236 | 5/1956 | Landis et al. | |
| 2,984,445 | 5/1961 | Dobrikin | 248/75 |
| 3,650,545 | 3/1972 | Freed | 248/51 X |
| 4,210,796 | 7/1980 | Moerke | |
| 4,218,166 | 8/1980 | Abu-Akeel et al. | |
| 4,356,554 | 10/1982 | Susnjara et al. | |
| 4,460,140 | 7/1984 | Ramazzotti | 248/75 |
| 4,563,567 | 1/1986 | Geffroy et al. | 901/15 X |
| 4,582,281 | 4/1986 | Van Camp | 248/51 |

FOREIGN PATENT DOCUMENTS

| | | |
|---|---|---|
| 2754697 | 7/1978 | Fed. Rep. of Germany ..... 248/74.1 |
| 3237184 | 5/1983 | Fed. Rep. of Germany . |
| 2041833 | 2/1971 | France . |
| 2280013 | 2/1976 | France . |
| 5177813 | 1/1978 | Japan ..................................... 901/15 |
| 81/00111 | 4/1982 | PCT Int'l Appl. . |
| 1244057 | 8/1971 | United Kingdom . |
| 2134074 | 8/1984 | United Kingdom . |

Primary Examiner—Ramon S. Britts
Assistant Examiner—Karen J. Chotkowski
Attorney, Agent, or Firm—McGlew and Tuttle

[57] ABSTRACT

To supply the implement, mostly a welding tool, of a manipulator (1), with energy, the invention, instead of running the supply lines in the known manner from a fixed point in a large, freely suspended loop directly to the tool, provides an external suspension of a line bundle (10) along the constructional assemblies of the manipulator. In accordance with the invention, this line bundle (10) is held in place and guided in tubular casings (13) which are disposed at the individual assemblies (3–5) of the manipulator (1), with inserts (19) being provided in these casings (13) for receiving and holding lines of unequal size (parallel with each other) which are adapted to the various functions of the manipulator and can quickly be exchanged.

17 Claims, 13 Drawing Figures

SYSTEM OF EXTERNALLY HOLDING AND GUIDING SUPPLY LINES TO MOVING IMPLEMENTS OF MANIPULATORS

BACKGROUND OF THE INVENTION

FIELD OF THE INVENTION

This invention relates, in general, to manipulators and, in particular, to a new and useful device for positioning supply line bundles in respect to the articulated assemblies of the manipulator.

The moving implements or tools of manipulators must be supplied with energy, electric power, coolants, pressure fluids, etc. This supply is effected through a plurality of lines which may take the form of electrical power lines, flexible tubes, pressure tube, etc.

The general problem with manipulators is how to ensure these supplies even in instances where the tool executes whatever movements in space. Heretofore, this problem has been solved by running the supply lines from a fixed point in a large, freely suspended loop directly to the tool, as shown, for example, in German application disclosure No. 22 27 288. This manner of supplying has the disadvantage, however, that the line loop is moved about in space along with the tool and thus exposed to considerable torsional and bending loads. Also, such a supply line can be employed at most for robots and manipulators having a small working range. As soon as a manipulator is capable of swinging its arm overhead, the supply lines had to take on such dimensions that they would continually be in danger of getting caught somewhere or even being squeezed off.

SUMMARY OF THE INVENTIONS

The present invention is therefore directed to a system of external holding and guiding of supple lines to manipulator tools, which would guard the supply lines from damages and could follow without obstacles any spatial movement of the tools.

In accordance with the invention, instead of being suspended freely in space, as hitherto, relatively short sections of the supply lines bundled together are now run between holders mounted along the constructional assemblies of the manipulator. In the inventive system, the lines may extend from the stationary base over all the moved constructional assemblies up to the tool, but they also may extend from another of the assemblies, such as from the upper arm.

By providing one holder on each of the moved constructional assemblies, only relatively small loops of supply lines remain in extended positions and are therefore less loaded, starting by their own weight. Further, the dynamic loads on the manipulator are reduced. The rotary mounting of the holders in the regions of the axes has the advantage that these locations are relatively at rest as compared to the movements of the adjacent assemblies. Therefore, only the line section extending between the moved and the adjacent assembly is moved along. The other line sections remain relatively immobile and follow at most a small rotary motion of the holder. The inventive system of running lines makes now also possible overhead movements of the manipulator arm without the risk of crushing or otherwise damaging the supply lines. The result is a substantial extension of the life of the supply lines, quite disregarding the fact that they no longer represent a safety hazard.

The holders may be designed in various ways, for example as separating strips, etc. Particularly advantageous is the shape of a tubular casing having an insert which is guided therein and holds the line together. Such a holder may advantageously be employed also for running other kinds of lines. It not only helps to preserve the supply lines guided therethrough, but also permits a quick exchange of the individual lines or of the entire line bundle.

This is particularly important in the operation of industrial robots or manipulators which are employed at a growing rate in the small-scale series manufacture and for short-term jobs varying all the time. Such an operation requires frequent changes of the implement and of the supply line connected thereto. A plurality of holders is provided for running the supply lines, it would be bothersome to unthread the old lines and thread in the new ones. Further, different implements require a different number of supply lines with unequal diameters. A bundle with ten lines, for example, is not an exceptional number, especially for advancing types of welding apparatus.

The invention solves this problem by providing exchangeable holder inserts and a casing which can be opened and whose parts can be reconnected by a quick-acting clamp.

The inserts can thus remain connected to the line and exchanged along with them for new lines having inserts of their own.

Instead, prepared line bundles may be exchanged in the same quick manner as well. The holder inserts at the lines are preassembled.

The inserts themselves are guided in the holders positively and/or non-positively in the direction of the line. In the circumferential direction, however, the guidance may be tight or loose. A loose guidance, in the case of a circular insert and holder, permits a rotary motion of the insert in the holder about the line axis. The line bundle is thus enabled to easily follow the corresponding rotary movements of the manipulator wrist. A loose guidance can be adjusted by providing a corresponding play between the holder and the insert, or a special support, such as through slide rings.

With a provided tool exchange and a larger number of lines, it is advisable to leave the inserts on the line bundle and exchange the complete bundle together with the inserts against a new one. In such a case, inserts having a simple thrubore may satisfactorily receive the lines. The inserts are threaded on the lines subsequently and remain attached thereto.

However, in accordance with the objective of permitting a quick tool exchange, the invention provides specific shapes of inserts having their bores, recesses, etc. accessible from the outside so that the lines can be inserted quickly. With this design, no threading of the lines into the inserts is needed. The inserts rather either have peripherally open bores of the kind of a retaining clip, or comprise separable or hinged parts, depending on the design. This makes it possible to quickly exchange defective lines, for example, or to put in place in the inserts new, additional lines, without changing anything in the other lines of the bundle.

The inserts themselves may vary in shape, depending on the kind of the supply lines, and may be designed as a circular disc, an elongated tubular body, or a disc-shaped extension with guide sleeves.

The disc-shaped insert is intended for receiving individual lines in circumferentially distributed bores in the form of retaining clips accessible from the periphery.

In a disc-shaped insert, the individual lines are guided as a compact bundle, thus extend closely to the neutral axis. This produces effect particularly in bundles having a large number of lines, with the result that with a bending of the line bundle in any direction, the radiuses of curvature of all the lines remain substantially identical. Also, lines remote from the neutral axis are thereby prevented from being squeezed.

To obtain as dense a bundle of lines as possible, particularly if a large number of individual lines is handled, the invention provides multipart, disc-shaped holder inserts. The parts of these inserts are provided with bores, recesses, etc. which also are accessible from the outside, and into which the individual lines are inserted, preferably clipped. The parts of the insert are positively engaged with each other and secured by a circlip, a clamp, etc., so that they form a disc-shaped unit held positively in assembled state. As an alternative, the disc-shaped insert may be designed as a single piece. Then it is made of a resilient material, preferably a plastic, and provided with parting joints or slits along which it can be opened to make the inside bores accessible from the outside. For arc welding, relatively pliant supply lines are used for which tubular inserts are particularly suitable. The lines are bundled and guided as an enclosed compact bundle of flexible tubes in these yielding tubular inserts whose guiding lengths prevents them from sharp squeezing which would be particularly dangerous in pliant tubes. For other purposes, the inserts may be made of stiffer materials.

The disc-shaped extension in combination with guide sleeves makes it possible to provide individual lines in addition to a received bundle of line or flexible tubes, with the additional lines being clipped in in peripherally accessible bores of the extension.

To ensure a quick reception of the bundle of lines or flexible tubes, the two kinds of tubular inserts are provided with a lengthwise extending parting slit permitting to bend the insert open, or to take it apart. The tubular insert is then closed again by means of a tightening string etc., or by an adhesive.

The other dependent claims relate to advantageous embodiments of the invention.

The invention is shown by way of example and diagrammatically in the drawing in which.

DESCRIPTION OF THE PREFERRED EMBODIMENTS

Figure 1:
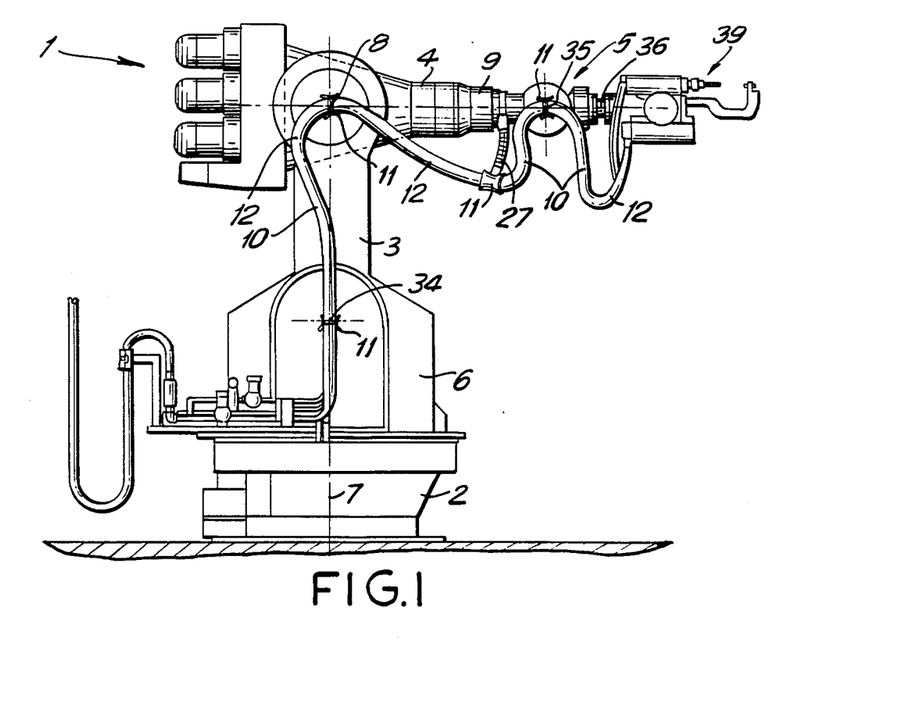
FIG. 1 is a side view of a manipulator and of constructional assemblies thereof, with the associated supply lines.

FIG. 1 shows an embodiment of a manipulator 1 in a side view. Such a manipulator 1 is built up of different assemblies which are movable relative to each other. In the shown embodiment, the manipulator has six axes and comprises a stationary base 2, a pivot 6, a swing arm 3, an upper arm 4 pivotable thereon about a horizontal axis 8, and a wrist 5 which is jointed to the end of upper arm 4 in various ways. Wrist 5 carries an implement or tool 39, in the present example, a welding tool. Another implement may be carried by wrist 5 instead, such as a water jet cutter, a spray gun, a wheel gripper with a nut setter, a drilling jig, etc. In the shown example, wrist 5 is rotatable about axis 9 which extends along upper arm 4 and above an axis 35 extending perpendicularly thereto. Tool 39 is mounted for rotation relative to wrist 5, about another axis 36. Depending on the kind of the tool, further mobilities may be provided.

The welding tool requires a supply of power and operating means in various forms. In the first place, supplied must be electric power, a coolant, a pressure fluid, etc. If the tool is to be moved separately, and correspondingly driven, these drives must also be supplied. If other implements are used instead of the welding tool, the supply of power and operating means changes correspondingly.

In the example of FIG. 1, the energy is supplied to tool 39 through a bundle of supply lines 10 which are run externally of manipulator 1. Such a bundle of lines 10 is expected to permit the different assemblies 2 to 6 to execute their most various movements, and that is why line bundle 10 is guided in holders 11, and extend in loops 12 between the holders 11. Loops 12 make it possible to line bundle 10 to follow the individual movements of the assembly.

Holders 11 are mounted on the assemblies for rotary motion, in the zone of the axes of the manipulator. In the embodiment of FIG. 1, holders 11 are mounted on the bearing brackets or other parts relatively immovable, of the pivot 6, the swing arm 3, and the wrist 5, in a manner such that the axis of rotation of holders 11 coincides with axes 35, 8, and 34 of the manipulator. Depending on the mechanical peculiarities of other manipulators, the holders may be provided a little farther from said axes.

It is noted that swing arm 8 has a longitudinal axis extending from its pivot axis 34 to the pivot axis 8 for the upper arm 4. The axis of rotation for each of the holders 11 and 11 at the axes 34 and 8, lie in a plane containing the longitudinal axis of the swing arm 3. In likewise fashion, the rotation axes of holder 11 and 11 at axes 8 and 35 for the upper arm 4, lie in a plane which also contains the longitudinal axis of the upper arm 4.

In the following, the effect of this arrangement of holders is shortly explained in an example:

If tool 39 is to be pivoted from its position shown in FIG. 1 vertically upwardly, upper arm 4 is pivoted relative to swing arm 3 above axis 8. Loops 12 follow this pivotal motion along upper arm 4 and wrist 5. The length of loops 12 does not vary during this motion, only holders 11 turn a little along thus preventing line 1 to 10 from being squeezed, and instead, permitting it to come into a bent position along manipulator assemblies 2 to 6 in which it is favorably loaded.

Loops 12 make further possible that, for example, wrist 5 can turn about axis 9, and line bundle 10 is capable of following this rotary movement. It is further favorable if holders 11 are provided as close as possible to axes 7, 9 and 36, since the pivotal travel of the holders about these axes is thereby reduced and, consequently, loops 12 may be shorter. To pivot 6, the line bundle 10 is led from the outside also in a loop permitting rotary motion.

Figure 2:
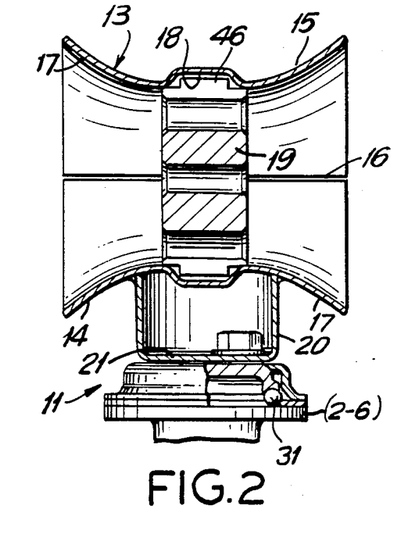
FIG. 2 is a longitudinal sectional view of a tubular casing for receiving a bundle of lines.

According to the embodiment of FIG. 2, a single holder 11 for line bundle 10 comprises a tubular casing 13 including a fixed part 14 and a movable part 15, which parts are separated from each other by a parting joint 16. Either of these parts 14, 15 has flaring end portions 17 and is provided with a mounting groove 18 in which an insert 19 can be clamped. The various shapes of this insert may be learned from FIGS. 3, 4 and 6 to 13. The critical feature primarily illustrated by FIG. 2 is that an insert 19 can be exchangeably clamped in tubular casing 13. Inserts 19 may vary in the number or diameter of the bores. In the shown example, the fixed part 14 of tubular casing 13 has an extension 20 firmly connected thereto. Everyone of extensions 20 is rotatably connected, through a flange 21 and a bearing 31, preferably a simple ballbearing, to one of the assemblies 2 to 6 shown in FIG. 1.

The purpose of insert 19 is to receive the individual lines of line bundle 10 in locally constant position and mutually parallel extensions, thereby also centering the bundle 10 to a certain degree. Since a certain mobility of the line bundle 10 must be curved in view of the relative mobility of assemblies 2 to 6, the tubular casing is provided with flaring end portions 17 on both sides, as shown in FIG. 2, permitting bundle 10 to smoothly apply thereto in bent position and avoid squeezing (see also FIG. 1).

Insert 19 which is clamped in tubular casing 13 crosswise of the longitudinal axis thereof and shown in FIGS. 3,4,6,7,8 and 13, is provided with bores, recesses, etc. 22 which are located primarily at the periphery. The front edges of the bores are chamfered 23 (see FIG. 4). Bores 22 are to receive the individual lines of bundle 10 in a centered manner.

Figures 3, 4:
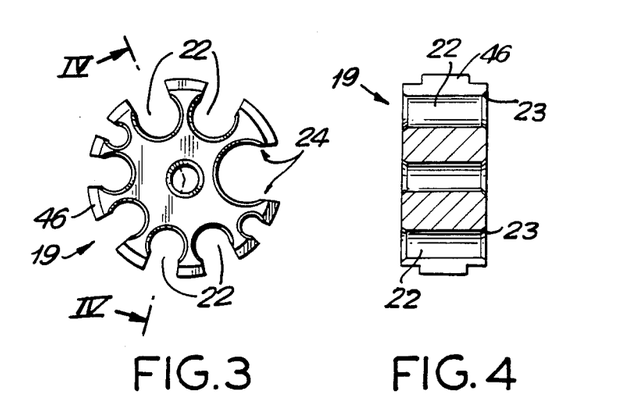
FIG. 3 is a side view of a disc-shaped insert clamped in a tubular casing.
FIG. 4 is a longitudinal sectional view of the insert, taken along the line IV—IV of FIG. 3.

In the embodiment of FIG. 3, bores 22 are arranged peripherally. Therefore, a radial access 24 must be ensured, to be able to insert the individual lines into bores 22 from the outside. Depending on their purpose, the lines are not equally thick, so that bores 22 too must have unequal diameters. The number and thickness of the needed supply lines may vary from tool to tool. Their position within the bundle also may vary, depending on where the individual lines are connected to the tool.

To keep the individual lines firmly in their position in insert 19, bores 22 have their entrances 24 narrowed. Since the lines are mostly coated with an elastic material, this establishes a clip connection preventing the lines from slipping out unintentionally. As may be learned from FIGS. 2 and 4, insert 19 is provided with a circumferentially extending extension in the form of a step 46 positively fitting the mounting groove 18 of casing 13.

The line packing density obtainable with insert 19 shown in FIG. 3 is limited, even though an additional supply line can be provided running through the center bore and being put in place by threading insert 19 thereon.

Figure 6:
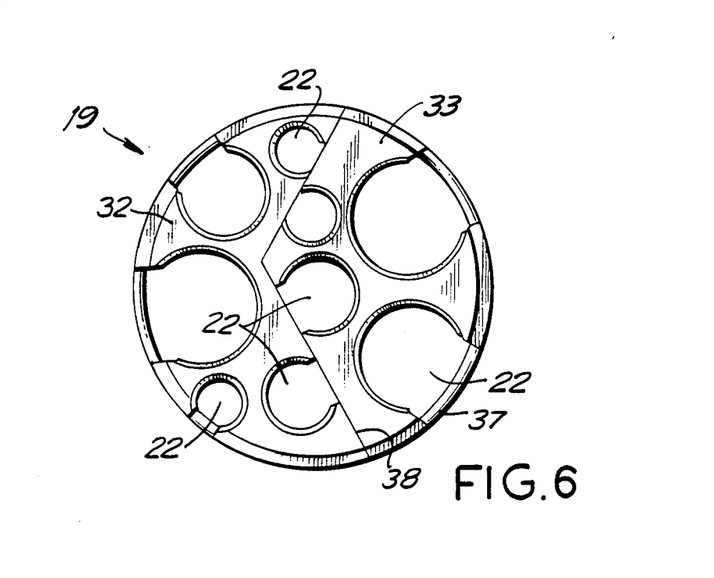
FIG. 6 is a side view of a multipart disc-shaped insert.
Figures 7, 8:
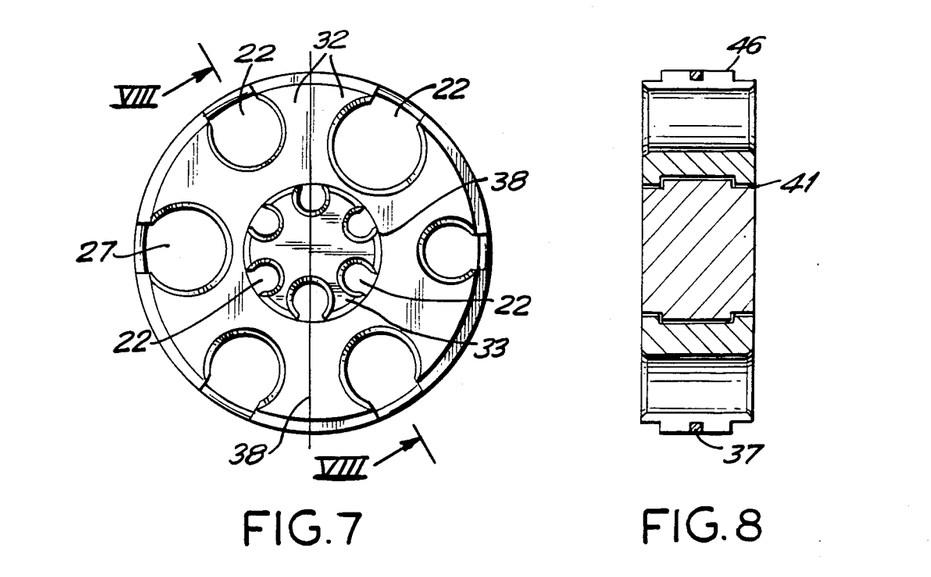
FIG. 7 is a modified embodiment corresponding to FIG. 6.
FIG. 8 is a longitudinal sectional view of the multipart insert, taken along the line VIII—VIII of FIG. 7.

The embodiments of FIGS. 6 to 8 permit a higher packing density without unfavorably effecting the possibility of connecting the supply lines to the insert quickly (=peripheral bores). According to FIG. 6, the disc-shaped insert 19 comprises two parts 32,33 which, in assembled state, fit each other along a parting line 38. In separated state, parting line 38 forms on either of the parts 32,33 a new peripheral zone in which further bores 22 are provided. Upon clipping the lines in, insert part 32,33 are assembled with each other. To form a disc positively held in assembled state, a circlip 37, etc. is provided embracing the assembly from the outside. Sirclip 37 may be received in a circumferential groove. Along parting lines 38, bores 22 in the individual parts 32,33 may be provided in positions opposite each other.

FIG. 7 shows another modification of the disc-shaped insert 19 which, in this embodiment, comprises a total of three parts. Insert part 32 is divided in two and these two sectional parts surround and positively engage another, centrally disposed part 33. In this embodiment, the parting line 38 is formed by the circumference of insert part 33. Insert part 33 is provided on its circumference with bores 22. In a modification of this embodiment, insert parts 32 may be provided with bores 22 even in the zone of parting line 38. Similarly to the embodiment of FIG. 6, insert parts 32,33 may be held in assembled state by means of a circlip or another circumferential tensioning element. It is also possible, however, to hold insert part 32 together by a clip connection along their parting line.

FIG. 8 shows circlip 37 received in a circumferential groove, and a positive connection 41 between parts 32,33.

Figures 12, 13:
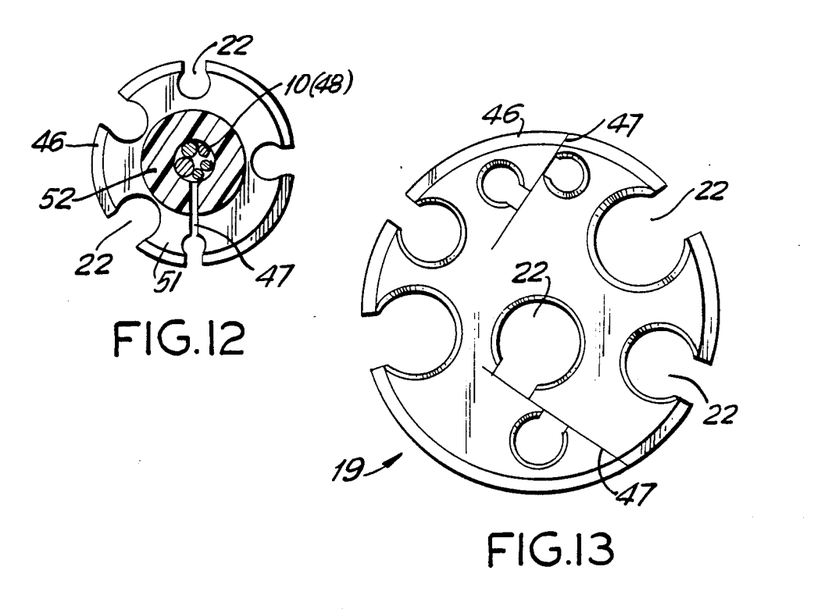
FIG. 12 is a cross-sectional view of a tubular insert, taken along the line XII—XII of FIG. 11.
FIG. 13 is a side view of a disc-shaped insert, in a modified design of FIG. 6.

FIG. 13 shows a modified embodiment of FIG. 6. In this design, again, disc-shaped insert 19 is provided with a bore 22 inside which is not readily accessible from the circumference of the disc. In this embodiment, disc-shaped insert 19 is made of a resilient material, preferably a plastic, and has two parting slits 47 which extend from the disc periphery inwardly, and to which the inside bores 22 are contiguous. Along these parting slits 47, the disc-shaped insert 19 can be bent open whereby the bores 22 inside become accessible for clipping in lines. Due to the resilience of the material, parting slit 47 closes again automatically. Further, disc-shaped insert 19 is held in assembled state by the circumferentially effective mounting groove 18.

The guidance of supply lines 10 in a plurality of holders 11 (see FIG. 1) makes sense only if, in connection with a change of the tool and/or of the line bundle, the line 10 can be removed from holders 11 quickly. In this respect, the invention provides a multi-part design of tubular casing 13, with the individual parts 14,15 being connected to each other by a quick-action clamp 25 and a commercial type of a hinge 53 (see FIG. 5). This quick-action clamp 25 may be embodied by a conventional tommy bar. With casing 13 open, line bundle 10 can be removed along with the specific inserts 19 thereof and exchanged for another line bundle already carrying new specific inserts clipped thereon. The clipping connection makes it possible to leave the respective inserts attached to their line bundle.

Holder 11 may be provided on one or more of the manipulator assemblies 2 to 6, it being advisable, however, to associate with each of the assemblies only one holder. Aside from being secured to the assembly directly, the invention also provides, in accordance with the showings of FIGS. 1 and 5, a holder 11 embodied as a resilient arm 27. Arm 27 is secured to the assembly, in the present example to upper arm 4, and intended to hold the loop 12 at distance and let it follow during a rotation of wrist 5 about axis 9.

Figure 5:
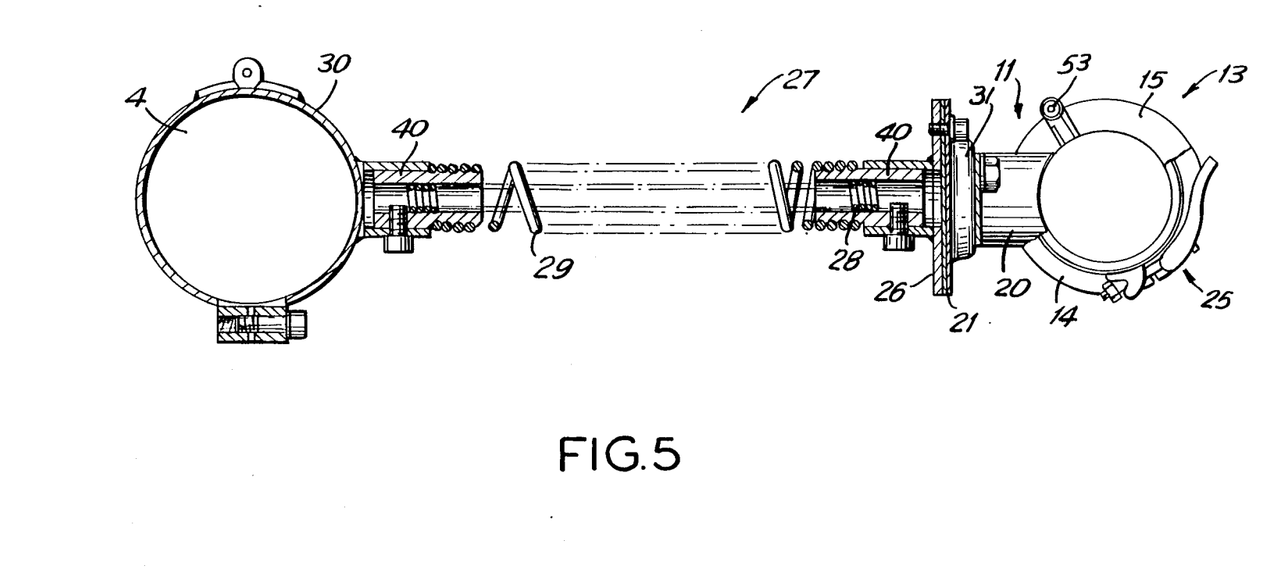
FIG. 5 is a side view of a tubular casing provided on a resilient arm.

In the embodiment of FIG. 5, holder 11 is rotatably connected to a flange 21 of a resilient arm 27 through a bearing 31 which is shown in more detail in FIG. 2. Due to this design, holder 11 again can adjust to a position to permit the loop 12 or the line bundle 10 to extend in an ideal bending line in terms of a most favorable load. Arm 27 is formed in this embodiment by two helical springs 28, 29 which are connected to a clamping collar 30 embracing upper arm 4 or another of assemblies of the manipulator. The two interengaging helical springs 28,29 ensure a stable, yet yielding guidance of holder 11 and thus of line bundle 10. Holder 11 remains rotatable relative to clamping collar 30, about the axis of arm 27. The outer helical spring 29 is screwed onto corresponding threads provided on extensions 40 of clamping collar 30 and flange 26. Extensions 40 are hollow and guide on their inside inner spring 28 which is held in position in the lengthwise direction by screws engaged therein.

To adjust the resilience of arm 27 to that of the respective bundle lines, an embodiment without spring 28 of arm 27 is also provided. It will be understood that without departing from the scope of the invention, holder 11 may be connected to the corresponding assemblies of a manipulator in a relatively movable manner in still other ways.

Figure 9:
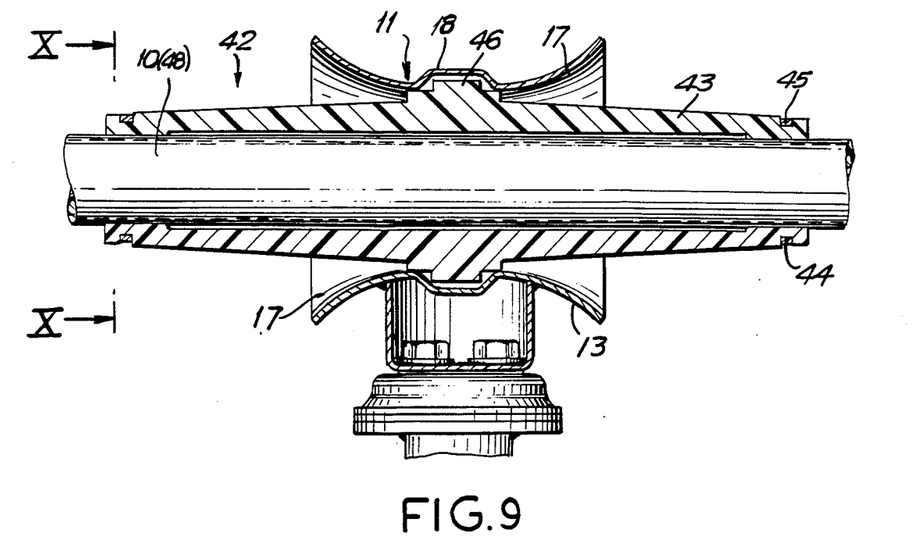
FIG. 9 is a longitudinal sectional view of a holder supporting a tubular insert.

FIG. 9 is a longitudinal sectional view of a holder 11 with another insert 42. Insert 42 is designed as tubular body 43 embracing a line bundle 10 or hose bundle 48 such as employed preferably for arc welding tools. The bundle 48 of flexible tubes is held together by a hose. In view of the sensitivity of the bundle to squeezing, tubular body 43 is designed as an elongated guide which protrudes on both ends beyond casing 13 of holder 11. Tubular body 43 is made of a resilient material, such as a plastic or rubber, and is tapered from the thicker center to both ends. Under a load, tubular body 43 bends to a slight arc protecting the sensitive hose bundler 48. At the center, tubular 43 is provided with a circumferential stepped extension 46 through which it is positively guided in mounting groove 18 of casing 13 in the line direction.

The stepped extension 46 of the various inserts may be guided in mounting groove 18 in the circumferential direction non-positively i.e. frictionally so as to guide the insert, which is clamped in casing 13, firmly in all directions. It is also possible, however, to guide the insert in casing 13 in the circumferential direction loosely, to permit the insert to turn with the line bundle to turn relative to casing 13 about the longitudinal axis of the lines. For this purpose, stepped extension 46 is guided in mounting groove 18 in the circumferential direction with play. In an alternative, a special bearing may be provided between extension 46 and groove 18, for example, in the form of slip rings. In such a case, it is assumed that, in accordance with the shown embodiments, stepped extension 46 and mounting groove 18 have circular cross-sections. Otherwise, however, casing 13, groove 18, the various inserts 19, 42,49, as well as extension 46 may have cross-sections of any other shape.

Figure 10:
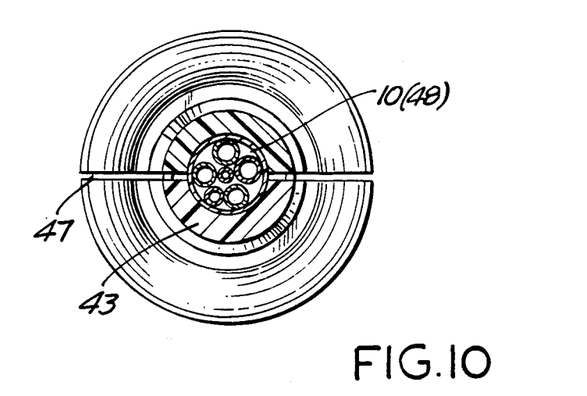
FIG. 10 is a sectional view of a tubular insert, taken along the line X—X of FIG. 9.

According to FIG. 10, tubular body 43 is split lengthwise by a parting slit 47 and, due to its resilience, can be opened, to change the hose bundle 48. Tubular body 43 may even be split at several locations and provided with hinges. In operation, tubular body 43 is held in assembled state by clamping strings, rings, etc. 45, which are inserted in circular grooves 44 provided in the end portions.

Figure 11:
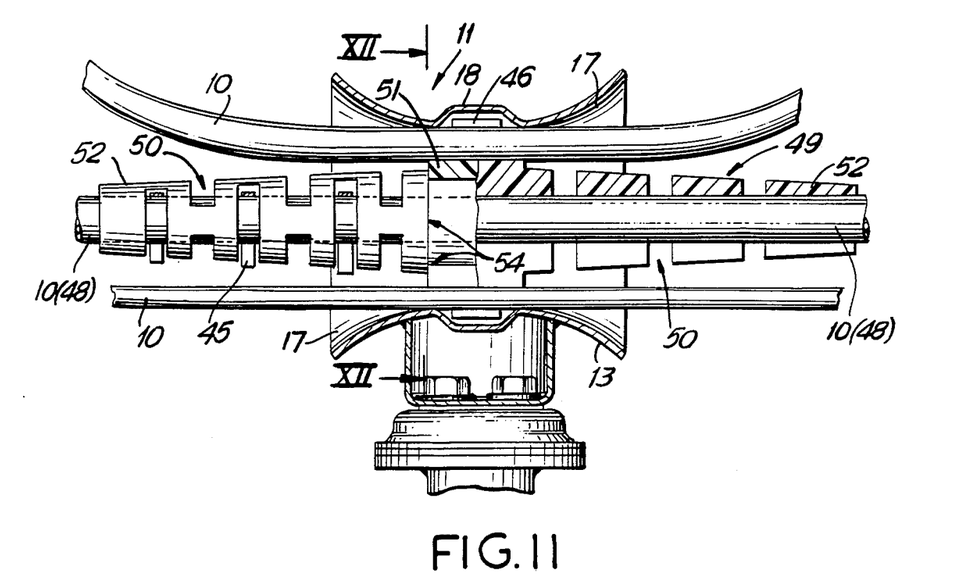
FIG. 11 is a longitudinal sectional view of a casing supporting a tubular insert, in a modified design of FIGS. 9 and 10.

FIGS. 11 and 12 show another design of tubular insert 49, modified as compared to that of FIGS. 9 and 10. Insert 59 comprises a disc-shaped extension 51 and two adjoining guide sleeves 52. Disc-shaped extension 51 is positively guided in mounting groove 18 of casing 13 through a shoulder 46. Sleeves 52 are connected to disc-shaped extension 51. Insert 49 may be made in a single piece (right-hand part of FIG. 11) or in several parts. With a multipart design, guide sleeves 52 are held assembled with extension 51 through a positive connection 54 (shown in the left-hand part of FIG. 11). As shown in FIG. 11, guide sleeves 52 are designed as a part having a centrally located annular groove. Disc-shaped extension 51 is designed as insert part 32 of FIG. 7 and half or fully parted. Sleeve body 52 is thus inserted or clipped by its groove into the central bore of disc-shaped extension 51. However, the guide sleeves 52 may also be connected to disc-shaped extension 51 positively, as individual parts.

Centrally guided in insert 49 is a line bundle 10 or hose bundle 48. Disc-shaped extension 41 is provided in addition on its circumference with bores 22 which are accessible from the outside and designed as clip holders for receiving additional lines 10. These lines 10, coming from a supply unit, for example, are initially run freely and then introduced into the hose bundle 48.

Guide sleeves 52 are provided in a manner known per se with alternatively located and angularly staggered recesses 50, to improve the resilience. Insofar, the purpose of guide sleeves 52 is the same as that of tubular body 43.

To be able to introduce a hose bundle 48, insert 49 is provided with a lengthwise extending parting slit 47. In the shown embodiment of FIG. 12, insert 49 is in a single piece and made of a resilient material. Parting slit 47 is provided unilaterally and extends only up to the center of insert 49 to permit the insert to be elastically bent open. As an alternative, insert 49 may be split entirely, as in the embodiment of FIGS. 9 and 10. With a multipart design of insert 49, possibilities are obtained of a design corresponding to the disc-shaped extension 51 of the embodiments of FIGS. 6–8. Guide sleeves 52 are held together at parting slit 47 in a way similar to that of FIG. 11, by tensioning strings 45. In an alternative, the sleeves may even be bonded together by an adhesive.

We claim:
1. A manipulator system comprising:
   a base (2);
   a pivot member (6) on said base;
   a swing arm (3) pivotally connected to said pivot member at one end thereof for rotation about a first pivot axis (34) to said pivot member (6), said swing arm having an opposite end and a longitudinal axis between its one and opposite ends extending perpendicularly to said first pivot axis;
   an upper arm (4) having one end pivotally connected to said swing arm at a second pivot axis (8), said upper arm having an opposite end, and a longitudinal axis extending between its one and opposite ends and extending perpendicularly to said second pivot axis;

a wrist (5) pivotally connected to said opposite end of said upper arm;

a tool (39) connected to said wrist;

a supply line (10) comprising a bundle of individual lines extending from said base along said swing arm and said upper arm and being connected to said tool;

a first holder having a tubular portion receiving said supply line rotatably mounted to said swing arm for rotation about said first pivot axis;

a second holder having a tubular portion receiving said supply line and pivotally mounted to said upper arm for rotation about said second pivot axis;

said pivot axes of said first and second holders lying in a common plane with said longitudinal axis of said swing arm and being positioned at a lateral side of said swing arm; and a third holder having a tubular portion rotatably mounted to said upper arm at said opposite end of said upper arm and with a rotation axis which, with said pivot axis of said second holder, lie in a common plane with said longitudinal axis of said upper arm, said second and third holders being disposed on one lateral side of said upper arm.

2. A system according to claim 1, wherein said wrist is pivotally connected to said opposite end of said upper arm at a third pivot axis (35) said rotation axis of said third holder being coaxial with said third pivot axis.

3. A system according to claim 2, wherein each of said tubular portions comprises at least a two-part tubular casing having a passage therethrough for the passage of said supply line and an insert in said passage having means for holding and guiding said individual lines.

4. A system according to claim 3, wherein said tubular casing includes an interior mounting groove, said insert being held in place by said groove.

5. A system according to claim 4, wherein said insert has a step-shaped protruding portion extending around its circumference and conformable to the said mounting groove.

6. A system according to claim 3, wherein said tubular casing comprises two parts which are hinged together and a quick action clamp connected between said tubular parts.

7. A system according to claim 3, wherein said both ends of said tubular casing have a flaring end portion.

8. A system according to claim 2, wherein said tubular portions each having a groove therein with an insert in said groove having a plurality of bores of varying diameters capable of carrying specific ones of said individual lines 9. A system according to claim 8, wherein each tubular portion comprises a split tubular body, said supply line extending through said tubular body.

10. A system according to claim 2, wherein each tubular portion comprises a tubular body made of a resilient material having a parting joint along its length and having a circular groove at each end for receiving a tightening string.

11. A system according to claim 2, wherein each tubular portion having an insert therein comprising a circular disk made of at least one part having a plurality of bores therethrough for the passage of individual lines of said supply line.

12. A system according to claim 11, wherein said bores have access openings which are smaller in diameter than the remaining portion thereof.

13. A system according to claim 2, wherein said tubular portions define a passage for said supply line having an insert therein, said insert having a split portion extending longitudinally along its length and permitting expansion of said portions thereof and a circles extending around said insert.

14. A system according to claim 2, including an insert in each tubular portion having bores for the passage of the individual lines, wherein said insert is made of a resilient material and has at least one parting joint, a plurality of bores adjacent thereto and extending in the interior of said insert, said insert being capable of being bent open along the parting joint to make the bores easily accessible from the outside.

15. A system according to claim 14, wherein said insert is made of a disk-shaped extension and including two guide sleeves, said individual lines being guided in said insert and said sleeves with at least one peripherally accessible bore being provided in said insert for guiding additional lines.

16. A system according to claim 14, wherein said insert is made of one piece of resilient material and has a lengthwise extension parting joint along which it can be opened.

17. A system according to claim 2, including a flexible arm (27) having a helical spring (29) extending therealong, said flexible arm having one end connected to said upper arm (4) and an opposite end, and a further holder having a tubular portion connected to said opposite end of said flexible arm.

* * * * *